(12) United States Patent
Deguchi et al.

(10) Patent No.: US 10,967,552 B2
(45) Date of Patent: Apr. 6, 2021

(54) VOID-CONTAINING POLYESTER FILM AND METHOD FOR PRODUCING SAME

(71) Applicant: TOYOBO CO., LTD., Osaka (JP)

(72) Inventors: Shoji Deguchi, Tsuruga (JP); Kenji Yoshino, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 13 days.

(21) Appl. No.: 16/086,825

(22) PCT Filed: Mar. 22, 2017

(86) PCT No.: PCT/JP2017/011307
§ 371 (c)(1),
(2) Date: Sep. 20, 2018

(87) PCT Pub. No.: WO2017/170002
PCT Pub. Date: Oct. 5, 2017

(65) Prior Publication Data
US 2019/0084206 A1 Mar. 21, 2019

(30) Foreign Application Priority Data

Mar. 29, 2016 (JP) .............................. JP2016-064792
Nov. 16, 2016 (JP) .............................. JP2016-223529

(51) Int. Cl.
| | | |
|---|---|---|
| B29C 48/00 | (2019.01) | |
| B29B 17/00 | (2006.01) | |
| B29C 55/04 | (2006.01) | |
| B29C 55/14 | (2006.01) | |
| B29C 48/21 | (2019.01) | |
| B29D 7/01 | (2006.01) | |
| B32B 27/20 | (2006.01) | |
| B29K 105/04 | (2006.01) | |
| B29K 105/00 | (2006.01) | |
| B29K 67/00 | (2006.01) | |
| B29K 23/00 | (2006.01) | |
| B29K 105/26 | (2006.01) | |
| B29C 48/08 | (2019.01) | |

(52) U.S. Cl.
CPC ........ *B29C 48/022* (2019.02); *B29B 17/0005* (2013.01); *B29C 48/21* (2019.02); *B29C 55/04* (2013.01); *B29C 55/143* (2013.01); *B29D 7/01* (2013.01); *B32B 27/205* (2013.01); *B29C 48/0018* (2019.02); *B29C 48/08* (2019.02); *B29K 2023/12* (2013.01); *B29K 2067/00* (2013.01); *B29K 2067/003* (2013.01); *B29K 2105/0094* (2013.01); *B29K 2105/041* (2013.01); *B29K 2105/26* (2013.01)

(58) Field of Classification Search
CPC ......... B32B 27/36; B32B 27/32; B32B 27/20; B32B 27/205
See application file for complete search history.

(56) References Cited

U.S. PATENT DOCUMENTS

| | | | |
|---|---|---|---|
| 2001/0036545 A1* | 11/2001 | Nishi | .................... B32B 3/26 428/315.7 |
| 2007/0004813 A1* | 1/2007 | Shelby | ................. B29C 55/005 521/134 |
| 2010/0209694 A1 | 8/2010 | Aoyama et al. | |

FOREIGN PATENT DOCUMENTS

| | | |
|---|---|---|
| JP | 7-17779 B2 | 3/1995 |
| JP | 8-143692 A | 6/1996 |
| JP | 8-252857 A | 10/1996 |
| JP | 9-39140 A | 2/1997 |
| JP | 2000-326647 A | 11/2000 |
| JP | 2003-105115 A | 4/2003 |
| JP | 2009-96999 A | 5/2009 |
| JP | 2014181312 A | 9/2014 |

OTHER PUBLICATIONS

International Search Report dated Jun. 20, 2017, issued in counterpart application No. PCT/JP2017/011307 (2 pages).
Office Action dated Jun. 30, 2020, issued in counterpart JP Application No. 2016-223529, with English translation (8 pages).
Office Action dated Oct. 14, 2020, issued in counterpart TW Application No. 106110522, with English Translation. (12 pages).

* cited by examiner

*Primary Examiner* — Hai Vo
(74) *Attorney, Agent, or Firm* — Westerman, Hattori, Daniels & Adrian, LLP

(57) ABSTRACT

A void-containing polyester is disclosed which is excellent in concealing properties, whiteness, and thermal dimensional stability. A void-containing polyester film includes an internal void-containing layer (layer A). The void-containing layer contains a polyester matrix resin and a polypropylene dispersed resin, and satisfies the following requirements (1) to (3), and an apparent density of the film is in a range of 0.8 to 1.2 g/cm$^3$.
(1) A melt viscosity ($\eta 1$) of the polyester resin at a melting temperature of 280° C. and a shear rate of 121.6 sec$^{-1}$ is 90 to 400 Pa·s
(2) A melt viscosity ($\eta 2$) of the polypropylene resin at a melting temperature of 280° C. and a shear rate of 121.6 sec$^{-1}$ is 300 to 850 Pa·s
(3) A melt viscosity ratio ($\eta 2/\eta 1$) of the polyester resin and the polypropylene resin at a melting temperature of 280° C. and a shear rate of 121.6 sec$^{-1}$ is 1.5 to 4.5.

14 Claims, No Drawings

VOID-CONTAINING POLYESTER FILM AND METHOD FOR PRODUCING SAME

TECHNICAL FIELD

The present invention relates to a void-containing polyester film and a method for producing the same. In detail, the present invention relates to a void-containing polyester film which contains voids of optimum size and is excellent not only in lightweight properties but also in concealing properties, whiteness, and thermal dimensional stability, even when a polypropylene resin is mainly used as a void-generating agent, and a method for producing the same.

BACKGROUND ART

Synthetic paper, which is a paper substitute containing a synthetic resin as a main component, is superior in water resistance, moisture absorption dimensional stability, surface stability and the like as compared with natural paper, and it is used in many ways, such as a label and a sticker, a poster, a recording paper, and a packaging material. Polyethylene resins, polypropylene resins, polyester resins or the like are used as the main raw material of the synthetic paper, and in particular, polyester resins typified by polyethylene terephthalate have excellent mechanical characteristics, thermal characteristics, and the like, thus they have been developed for a wide range of applications.

In general, examples of a method for obtaining a film having a function similar to that of paper include a method for containing many fine voids inside the film; a method for roughening by performing surface treatment such as sand blasting treatment, chemical etching treatment or matting treatment on a flat film; and the like. Among them, the former method for containing many fine voids inside the film is often employed, because of its merits such that, it can not only provide concealing properties and whiteness like paper but also reduce the cost per area since it can reduce the weight of the film itself, and excellent image clarity at the time of printing since it can provide moderate flexibility and cushioning properties.

As a method for generating fine voids inside the film, generally, an incompatible thermoplastic resin (hereinafter referred to as incompatible resin) is first mixed into a matrix made of a polyester resin to obtain a melt of sea-island structure in which the incompatible resin is dispersed in the polyester resin. Then, an unstretched sheet is formed by extrusion from a die and stretched in at least one axial direction to generate voids by interfacial peeling between the polyester resin and the incompatible resin. The incompatible resin is also referred to as a void-generating agent. Polyolefin resins such as polyethylene resins, polypropylene resins, and polymethylpentene resins; polystyrene resins and the like are preferably used as the type of the incompatible resin of an island component, with respect to the polyester resin as a sea component.

In the void-containing polyester film obtained by the above method, light is reflected at the interface between the polyester portion inside the film and the void portion, so that concealing properties and whiteness like paper can be obtained. Considering the reflection efficiency, it is known that a high reflection efficiency can be obtained by finely dispersing the incompatible resin as the island component and forming fine voids. Further, as the specific surface area is increased by finely dispersing, it is possible to efficiently reduce the weight (lower specific gravity) with a small addition amount. As a method for finely dispersing an incompatible resin, a method for adding a compatibilizer (also referred to as a dispersing agent) such as a surfactant or polyethylene glycol has been proposed (see, for example, Patent Documents 1 to 3).

PRIOR ART DOCUMENTS

Patent Documents

Patent Document 1: Japanese Examined Patent Application Publication No. H7-17779
Patent Document 2: Japanese Unexamined Patent Application Publication No. H8-252857
Patent Document 3: Japanese Unexamined Patent Application Publication No. 2009-96999

SUMMARY OF THE INVENTION

Problems to be Solved by the Invention

Among the above-mentioned incompatible resins, polypropylene resins are preferably used from the viewpoint of void-generating properties and cost performance. However, according to the results of studies by the present inventors, it was found that, when a compatibilizer such as a surfactant or polyethylene glycol was added to the polypropylene resin, the following problems were encountered.

First, it was found that, since the polypropylene resin having a melting point lower than that of the polyester resin is liable to be deformed in the heat-stretching step or the heat setting step, the void would be crushed when the polypropylene resin is excessively finely dispersed by the compatibilizer. It was also found that when a compatibilizer is added, the interfacial tension between the polyester resin and the polypropylene resin decreases, so that voids are hardly generated during heat stretching. In order to solve such a problem, for example, there is a means for lowering the heat-stretching temperature or the heat setting temperature so as not to deform the polypropylene resin, but it is not preferable because thermal dimensional stability and film-forming properties deteriorate. Therefore, when an inexpensive polypropylene resin is used as a void-generating agent, even when a fine dispersion technology of adding a compatibilizer is applied as conventional, it was difficult to obtain a void-containing polyester film excellent in void-generating properties (lightweight properties), concealing properties, and thermal dimensional stability.

Furthermore, when a surfactant or polyethylene glycol is used for the polypropylene resin, there is also a problem that whiteness, concealing properties, film-forming properties, and the like deteriorate. That is, since the surfactant and polyethylene glycol are inferior in heat resistance, there is a problem that thermal degradation easily occurs in the melt extrusion step of the polyester resin, whiteness of the obtained film decreases, and in some cases, deterioration of the polyester resin is promoted, and film-forming properties deteriorate. Generally, in the transverse stretching step in the production of a polyester film, the film is gripped by a tenter clip, and the clip gripping portion (ear portion) is reused or discarded when it cannot be reused. From the viewpoint of reduction of raw material cost and environment, it is preferable to reclaim and reuse the ear portion. However, when the polypropylene resin and the surfactant are used, thermal degradation easily occurs, due to heat history during not only the above extrusion step but also a reclaiming step.

Therefore, when a reclaimed raw material is used, whiteness of the film and film-forming properties decrease more and more.

The present invention has been made in view of the above circumstances, and it is an object of the present invention to provide a void-containing polyester film which can form voids of optimum size and is excellent not only in lightweight properties but also in concealing properties, whiteness, and thermal dimensional stability, even when a polypropylene resin is mainly used as a void-generating agent. It is a further object of the present invention to provide a void-containing polyester film excellent in concealing properties and whiteness even when a reclaimed raw material such as a clip gripping portion (ear portion) is used.

Solutions to the Problems

In view of the above problems in the case of using a polypropylene resin in combination with a compatibilizer, the present inventors have made intensive studies, in order to provide a void-containing polyester film capable of exhibiting a desired characteristic without using a compatibilizer. As a result, the present inventors have found that, when the melt viscosity and the melt viscosity ratio of the polyester resin and the polypropylene resin are adjusted within specific ranges, the dispersed particle diameter of the polypropylene resin in the polyester resin before stretching after melt extrusion can be adjusted to an appropriate size, and even after heat stretching and heat setting, a large number of voids of optimum size to an extent that the void is not crushed are obtained (specifically, 10 or more voids having an area of 10 to 50 $\mu m^2$ are present per 10000 $\mu m^2$ in the vertical cross section of the film). As a result, the present inventors have found that, according to the present invention, it is possible to obtain a void-containing polyester film excellent in lightweight properties, concealing properties, whiteness, and thermal dimensional stability, and preferably excellent in film-forming properties. Further, the present inventors have found that, according to the present invention, even when a reclaimed raw material such as a clip gripping portion (ear portion) is used, thermal degradation in the extrusion step and the reclaiming step is suppressed, and a void-containing polyester film capable of maintaining good concealing properties and whiteness can be obtained.

Namely, the constitution of the present invention is as follows.

1. A void-containing polyester film comprising an internal void-containing layer (layer A),
   wherein the void-containing layer contains a polyester matrix resin and a polypropylene dispersed resin, and
   10 or more voids having an area of 10 to 50 $\mu m^2$ are present per 10000 $\mu m^2$ when observing a vertical cross section of the film.

2. The void-containing polyester film according to above 1, wherein the void-containing layer satisfies the following requirements (1) to (3), and
   an apparent density of the film is in a range of 0.8 to 1.2 g/cm$^3$.
   (1) A melt viscosity ($\eta 1$) of the polyester resin at a melting temperature of 280° C. and a shear rate of 121.6 sec$^{-1}$ is 90 to 400 Pa·s
   (2) A melt viscosity ($\eta 2$) of the polypropylene resin at a melting temperature of 280° C. and a shear rate of 121.6 sec$^{-1}$ is 300 to 850 Pa·s
   (3) A melt viscosity ratio ($\eta 2/\eta 1$) of the polyester resin and the polypropylene resin at a melting temperature of 280° C. and a shear rate of 121.6 sec$^{-1}$ is 1.5 to 4.5

3. A void-containing polyester film comprising an internal void-containing layer (layer A),
   wherein the void-containing layer contains a polyester matrix resin and a polypropylene dispersed resin which satisfies the following requirements (1) to (3), and
   an apparent density of the film is in a range of 0.8 to 1.2 g/cm$^3$.
   (1) A melt viscosity ($\eta 1$) of the polyester resin at a melting temperature of 280° C. and a shear rate of 121.6 sec$^{-1}$ is 90 to 400 Pa·s
   (2) A melt viscosity ($\eta 2$) of the polypropylene resin at a melting temperature of 280° C. and a shear rate of 121.6 sec$^{-1}$ is 300 to 850 Pa·s
   (3) A melt viscosity ratio ($\eta 2/\eta 1$) of the polyester resin and the polypropylene resin at a melting temperature of 280° C. and a shear rate of 121.6 sec$^{-1}$ is 1.5 to 4.5

4. The void-containing polyester film according to above 2 or 3, wherein the melt viscosity ($\eta 2$) of the polypropylene resin is 700 Pa·s or less.

5. The void-containing polyester film according to any one of above 1 to 4, wherein the layer A further contains 5 to 60% by mass of a reclaimed raw material of the void-containing polyester film.

6. The void-containing polyester film according to any one of above 1 to 5, wherein a layer (layer B) made of a polyester resin is laminated on at least one side of the layer A.

7. The void-containing polyester film according to above 6, wherein the layer B contains inorganic particles.

8. The void-containing polyester film according to above 7, wherein the inorganic particles are titanium oxide.

9. The void-containing polyester film according to any one of above 1 to 8, wherein the layer A does not contain a compatibilizer.

10. The void-containing polyester film according to any one of above 1 to 9, wherein an optical density is 0.55 or more (in terms of thickness 50 $\mu m$), and a color tone b value is 4 or less.

11. The void-containing polyester film according to any one of above 1 to 10, wherein heat shrinkage in a longitudinal direction and a width direction when heat-treated at 150° C. for 30 minutes are both 2.0% or less.

12. A method for producing a void-containing polyester film comprising an internal void-containing layer (layer A), and having an apparent density in a range of 0.8 to 1.2 g/cm$^3$, comprising
    an extrusion step for forming a sheet having a layer (layer A) containing a polyester matrix resin and a polypropylene dispersed resin satisfying the following requirements (1) to (3), wherein the polypropylene dispersed resin has a dispersed particle diameter of 7 to 13 $\mu m$ in average circle equivalent diameter, by melt extrusion, and
    a stretching step for stretching the sheet at least in a uniaxial direction.
    (1) A melt viscosity ($\eta 1$) of the polyester resin at a melting temperature of 280° C. and a shear rate of 121.6 sec$^{-1}$ is 90 to 400 Pa·s
    (2) A melt viscosity ($\eta 2$) of the polypropylene resin at a melting temperature of 280° C. and a shear rate of 121.6 sec$^{-1}$ is 300 to 850 Pa·s
    (3) A melt viscosity ratio ($\eta 2/\eta 1$) of the polyester resin and the polypropylene resin at a melting temperature of 280° C. and a shear rate of 121.6 sec$^{-1}$ is 1.5 to 4.5

13. A method for producing a void-containing polyester film in which a layer (layer B) made of a polyester resin is laminated on at least one side of an internal void-containing layer (layer A), and having an apparent density in a range of 0.8 to 1.2 g/cm³, comprising an extrusion step for forming a sheet having the layer (layer A) containing a polyester matrix resin and a polypropylene dispersed resin satisfying the following requirements (1) to (3), wherein the polypropylene dispersed resin has a dispersed particle diameter of 7 to 13 μm in average circle equivalent diameter; and the layer (B), by melt extrusion, and a stretching step for stretching the sheet at least in a uniaxial direction.
(1) A melt viscosity (η1) of the polyester resin at a melting temperature of 280° C. and a shear rate of 121.6 sec$^{-1}$ is 90 to 400 Pa·s
(2) A melt viscosity (η2) of the polypropylene resin at a melting temperature of 280° C. and a shear rate of 121.6 sec$^{-1}$ is 300 to 850 Pa·s
(3) A melt viscosity ratio (η2/η1) of the polyester resin and the polypropylene resin at a melting temperature of 280° C. and a shear rate of 121.6 sec$^{-1}$ is 1.5 to 4.5

14. The method for producing a void-containing polyester film according to above 12 or 13, comprising, after the stretching step, a heat setting step for thermally setting at a temperature of (Tm−60° C.) to Tm, when the melting point of the polyester resin is Tm (° C.).

15. The method for producing a void-containing polyester film according to any one of above 12 to 14, wherein the reclaimed raw material obtained from the void-containing polyester film is returned to the extrusion step, and a proportion of the reclaimed raw material is set to 5 to 60% by mass in 100% by mass of resin raw materials of the layer A.

Effects of the Invention

According to the present invention, it is possible to provide a void-containing polyester film excellent in void-generating properties, concealing properties, whiteness, and thermal dimensional stability even when a polypropylene resin is mainly used as a void-generating agent. Further, according to the present invention, it is possible to provide a void-containing polyester film capable of maintaining excellent concealing properties, whiteness, and the like even when a reclaimed raw material such as a clip gripping portion (ear portion) is used.

MODE FOR CARRYING OUT THE INVENTION

As described above, the feature part of the void-containing polyester film according to the present invention is as following (i) or (ii).
(i) A void-containing layer (layer A) contains a polyester matrix resin (hereinafter simply referred to as a polyester resin) and a polypropylene dispersed resin (hereinafter simply referred to as a polypropylene resin), and 10 or more voids having an area of 10 to 50 μm² are present per 10000 μm² when observing a vertical cross section of the film.
(ii) The void-containing layer (A) contains a polyester matrix resin and a polypropylene dispersed resin satisfying the following requirements (1) to (3).
(1) The melt viscosity (η1) of the polyester resin at a melting temperature of 280° C. and a shear rate of 121.6 sec$^{-1}$ is 90 to 400 Pa·s (2) The melt viscosity (η2) of the polypropylene resin at a melting temperature of 280° C. and a shear rate of 121.6 sec$^{-1}$ is 300 to 850 Pa·s
(3) The melt viscosity ratio (η2/η1) of the polyester resin and the polypropylene resin at a melting temperature of 280° C. and a shear rate of 121.6 sec$^{-1}$ is 1.5 to 4.5

First, how the above requirements have been reached will be described.

As described above, in general, a void-containing polyester film is produced by dispersing an incompatible resin in a matrix containing a polyester resin. Furthermore, for low specific gravity and high concealing properties of the film, as shown in Patent Documents 1 to 3, a method for adding a compatibilizer such as a surfactant or polyethylene glycol to form fine voids is generally employed.

However, it was found that, in the case of using an inexpensive polypropylene resin as an incompatible resin, since the melting point of the polypropylene resin is low (roughly 160° C.) by the conventional fine dispersion method by adding a compatibilizer, the polypropylene resin is deformed by the heat-stretching step or the heat setting step after the melt extrusion and the void is crushed, and sufficient lightweight properties (void-generating properties) and concealing properties cannot be obtained. Further, it is desired to reuse the clip gripping portion (ear portion) or the like obtained in the process of producing a void-containing polyester film as a reclaimed raw material, and it was found that whiteness of the film, film-forming properties, and the like deteriorate due to thermal degradation in the melt extrusion step due to use of the compatibilizer, thermal degradation due to the heat history in the reclaiming step, and the like.

Therefore, the present inventors have considered the idea of controlling the particle diameter of the polypropylene resin in the polyester resin to an optimum size so that the void can be retained even after heat stretching and heat setting. Specifically, it was thought that, when the particle diameter of the polypropylene resin before heat stretching after melt extrusion is controlled so as to be increased to an extent that the void would not be crushed, not by a method for finely dispersing a resin using a compatibilizer as conventional, but by adjusting the melt viscosity and the melt viscosity ratio of the polyester resin and the polypropylene resin to specific ranges, the void can be retained even after heat stretching and heat setting.

Here, it is known that the particle diameter of incompatible polymer blends such as polyester resin and polypropylene resin is generally represented by the following empirical formula (see S. Wu, Polym. Eng. Sci., 27, 335 (1987)).

$$D = \frac{4\Gamma}{\eta_m \cdot \gamma}\left(\frac{\eta_d}{\eta_m}\right)^{\pm 0.84} \qquad \text{[Expression 1]}$$

(D: dispersion diameter, Γ: interfacial tension, Y: shear rate, $\eta_m$: interfacial tension of matrix, $\eta_d$: interfacial tension of domain)

According to the above formula, it can be seen that the dispersed particle diameter of the incompatible polymer blend is related to the melt viscosity ratio of the matrix (sea component) and the dispersion (island component), and when the above melt viscosity ratio (in light of the present invention, the melt viscosity ratio of the polyester resin and the polypropylene resin: η2/η1) is increased, the particle diameter of the polypropylene resin also increases. Therefore, in the present invention, by adjusting the above melt viscosity ratio (η2/η1), it was decided to control the dispersed particle diameter to an appropriate degree to an extent that the void is not crushed even after heat stretching and heat setting.

The conventional fine dispersion method is completely different in the idea for the void generation from the present invention that controls the dispersed particle diameter of the polypropylene resin by adjusting the above melt viscosity ratio, in that the conventional fine dispersion method is a technology of decreasing the dispersed particle diameter of the incompatible resin by decreasing the interfacial tension by adding a compatibilizer.

From the viewpoint of generating voids and lowering the low specific gravity, the dispersed particle diameter of the polypropylene resin is preferred to be larger. However, when the dispersed particle diameter becomes too large, the number of the voids to be obtained also decreases, so that the reflection efficiency decreases, and concealing properties deteriorate. Therefore, in the present invention, from the viewpoint of achieving both low specific gravity and high concealing properties, the size (area) and the number of the voids to be formed were controlled, by controlling the dispersed particle diameter of the polypropylene resin within a predetermined range.

Specifically, in the present invention, the dispersed particle diameter of the polypropylene resin before heat stretching after melt extrusion was controlled to the range of 7 to 13 μm in average circle equivalent diameter, by controlling the melt viscosity ratio (η2/η1) of the polyester resin and the polypropylene resin to the range of 1.5 to 4.5. As a result, a void-containing polyester film having a number density of optimum size to an extent that the void is not crushed (specifically, 10 or more voids having an area of 10 to 50 μm$^2$ are present per 10000 μm$^2$) after the heat-stretching step and the heat setting step was obtained.

How the present invention was reached has been described above.

Next, the present invention will be described in detail.
(Regarding Internal Void-Containing Layer (Layer A))

The void-containing polyester film of the present invention contains an internal void-containing layer (layer A) in which a polypropylene resin that is a void-generating agent (incompatible resin) is dispersed in a polyester film of a matrix component. A compatibilizer such as polyethylene glycol or a surfactant is not contained, from the viewpoint of whiteness and void-generating properties. The void-containing polyester film of the present invention may be composed of only the layer A or may have a layer B laminated on at least one side of the layer A as described later.

The polyester resin used in the layer A satisfies the melt viscosity (η1) of the following requirement (1), from the viewpoint of film-forming properties and whiteness. The melt viscosity (η1) is preferably 130 to 350 Pa·s. When η1 is lower than 90 Pa·s, whiteness of the obtained film decreases and film-forming properties deteriorate. On the other hand, when η1 is higher than 400 Pa·s, there are problems such as deterioration of kneading performance in the melt extrusion step and rise in back pressure.

(1) The melt viscosity (η1) of the polyester resin at a melting temperature of 280° C. and a shear rate of 121.6 sec$^{-1}$ is 90 to 400 Pa·s The polyester resin used for the layer A is a resin synthesized from a dicarboxylic acid or an ester-forming derivative thereof and a diol or an ester-forming derivative thereof. Representative examples of such a polyester resin include polyethylene terephthalate, polybutylene terephthalate, polyethylene-2,6-naphthalate, and the like. Polyethylene terephthalate is preferable, from the viewpoint of mechanical characteristics, heat resistance, cost, and the like.

The polyester resin may be copolymerized with other component within a range that does not impair the effect of the present invention. Examples of the copolymerization component include dicarboxylic acid components such as isophthalic acid, naphthalenedicarboxylic acid, 4,4-diphenyldicarboxylic acid, adipic acid, sebacic acid, and ester-forming derivatives thereof; and diol components such as diethylene glycol, hexamethylene glycol, neopentyl glycol, and cyclohexanedimethanol. Furthermore, examples of the copolymerization component include polyoxyalkylene glycols such as polyethylene glycol and polypropylene glycol. The content of the copolymerization component in the polyester resin is preferably 10 mol % or less, and more preferably 5 mol % or less, per a repeating unit constituting the polyester resin.

Next, the polypropylene resin contained in the layer A satisfies the melt viscosity (η2) of the following requirement (2), from the viewpoint of void-generating properties and film-forming properties. The melt viscosity (η2) is preferably 350 Pa·s or more and 700 Pa·s or less, and more preferably 650 Pa·s or less. When η2 is lower than 300 Pa·s, the polypropylene resin is liable to be deformed by extrusion from the die in the melt extrusion step, so that it is difficult to form a void. In addition, when a reclaimed raw material is used, whiteness of the obtained film decreases. On the other hand, when η2 is higher than 850 Pa·s, problems such as deterioration of kneading performance in the melt extrusion step and rise in back pressure occur. The film-forming properties are further improved by controlling η2, preferably to 700 Pa·s or less.

(2) The melt viscosity (η2) of the polypropylene resin at a melting temperature of 280° C. and a shear rate of 121.6 sec$^{-1}$ is 300 to 850 Pa·s As the polypropylene resin, crystalline polypropylene is preferably used. The polypropylene resin is more preferably a crystalline polypropylene having a propylene unit of 95 mol % or more, further preferably a crystalline polypropylene having a propylene unit of 98 mol % or more, and most preferably a crystalline polypropylene homopolymer having a propylene unit of 100 mol %.

The content of the polypropylene resin is preferably 3 to 25% by mass, and more preferably 5 to 20% by mass, based on the total amount of components (polyester resin and incompatible resin) in the layer A, from the viewpoint of void-generating properties and film-forming properties. When the content of the polypropylene resin is less than 3% by mass, there is a possibility that a void for obtaining sufficient lightweight properties cannot be formed. On the other hand, when the content of the polypropylene resin exceeds 25% by mass, film-forming properties tend to deteriorate.

In the layer A, other incompatible resin other than the polypropylene resin may be contained as a void-generating agent within a range that does not impair the effect of the present invention, but it is better to use less. The content of the polypropylene resin based on the total amount of the incompatible resin contained in the layer A is preferably 90% by mass or more, more preferably 95% by mass or more, and most preferably 100% by mass.

In the void-containing polyester film of the present invention, it is important for the melt viscosity ratio (η2/η1) of the melt viscosity (η1) of the polyester resin and the melt viscosity (η2) of the polypropylene resin to satisfy the range of 1.5 to 4.5, as shown in the requirement (3). This makes it possible to control the dispersed particle diameter of the polypropylene resin in the polyester resin without using a compatibilizer, and voids of optimum size to an extent that the void is not crushed can be obtained. As a result, it is possible to provide a void-containing polyester film excellent not only in lightweight properties but also in concealing properties and whiteness. The melt viscosity ratio ($\eta2/\eta1$) is preferably 2.0 to 4.0. When $\eta2/\eta1$ is smaller than 1.5, the void is liable to be crushed, thus it is difficult to obtain a large void having an area of 10 to 50 $\mu m^2$, and sufficient lightweight properties and concealing properties cannot be obtained. On the other hand, when $\eta2/\eta1$ is larger than 4.5, a large void having an area of 10 to 50 $\mu m^2$ is formed, but the number of the voids decreases, and thus concealing properties deteriorate.

In the layer A, additives usually used in the art can be added to the polyester resin or the polypropylene resin within a range that does not impair the effect of the present invention. Examples of such additives include polymers other than the above, antioxidants, heat stabilizers, matting agents, pigments, ultraviolet absorbers, fluorescent whitening agents, plasticizers, and the like. In particular, in order to suppress the oxidative deterioration of the polypropylene resin, it is preferable to contain an antioxidant, a heat stabilizer, and the like. The types of the antioxidant and heat stabilizer are not particularly limited, and examples thereof include hindered phenol type, phosphorus type, hindered amine type, and the like, which may be used alone or in combination. The addition amount of the antioxidant is preferably in the range of 1 to 50000 ppm based on the entire film. Similarly, the addition amount of the heat stabilizer is preferably in the range of 1 to 50,000 ppm based on the entire film. In the present invention, since it is excellent in whiteness, a fluorescent whitening agent, among the above additives, may not be added to the film.

In order to further improve concealing properties and whiteness, inorganic particles can be added to the polyester resin or the polypropylene resin, as necessary. The type of the inorganic particles is not particularly limited, and examples thereof include silica, kaolinite, talc, calcium carbonate, zeolite, alumina, barium sulfate, titanium oxide, zinc sulfide, and the like. Among them, titanium oxide, calcium carbonate, and barium sulfate are preferable, from the viewpoint of further improving concealing properties and whiteness. The inorganic particles may be used alone or in combination of two or more kinds. The inorganic particles can be contained in the film by previously adding them to the polyester resin or the polypropylene resin.

A method for mixing the inorganic particles with the polyester resin or the polypropylene resin is not particularly limited, and examples thereof include a method in which the polyester resin and the polypropylene resin are dry-blended and then directly added to a film forming machine; a method in which the polyester resin and the polypropylene resin are dry-blended and then melt-kneaded using various common kneaders to prepare a master batch; and the like.

The void-containing polyester film of the present invention may contain a clip gripping portion called an ear portion generated in the film forming step, a scrap film generated by breaking trouble or the like in the layer A as a reclaimed raw material, and even when using a reclaimed raw material, good concealing properties and whiteness can be obtained. Specifically, it is preferable to return the reclaimed raw material obtained from the void-containing polyester film to the extrusion step, and contain this reclaimed raw material in an amount of 5 to 60% by mass in 100% by mass of the resin raw materials of the layer A, from the viewpoint of whiteness, film-forming properties, and the like. Although the reclaimed raw material may be contained in the layer B, it is preferable not to contain it because there are problems such as deterioration in whiteness and exposure of the polypropylene resin in the reclaimed raw material.

(Regarding Layer B)

The void-containing polyester film of the present invention may be a laminate in which a layer (layer B) made of a polyester resin is laminated on at least one side of the internal void-containing layer (layer A). The polyester resin used for the layer B may contain inorganic particles. By adopting such a laminated structure, the layer A containing the polypropylene resin is exposed on the surface layer in the film production step, so that contamination such as roll staining can be prevented. When the layer A contains a reclaimed raw material and the polyester resin used for the layer B contains inorganic particles, it is possible to prevent decrease in whiteness by covering the layer A with the layer B.

Example of the laminate includes two layers (layer A/layer B) or three layers (layer B/layer A/layer B). The laminate is preferably three layers.

When the void-containing polyester film layer of the present invention is composed of three layers, the ratio of the total thickness of the layer B (the total thickness of both outermost layers) to the thickness of the entire film is preferably 1 to 40%, and more preferably 5 to 30%, from the viewpoint of void-generating properties and suppressing exposure of the polypropylene resin. When the thickness of the layer B is less than 1%, there is a possibility that exposure of the polypropylene resin cannot be sufficiently suppressed. On the other hand, when the thickness of the layer B is greater than 40%, it tends to be difficult to form a void for obtaining sufficient lightweight properties and cushioning properties.

The inorganic particles contained in the layer B are not particularly limited, and examples thereof include silica, kaolinite, talc, calcium carbonate, zeolite, alumina, barium sulfate, titanium oxide, zinc sulfide, and the like. From the viewpoint of concealing properties and whiteness, titanium oxide, calcium carbonate, and barium sulfate are preferable, and titanium oxide is more preferable. The inorganic particles may be used alone or in combination of two or more kinds. The inorganic particles can be contained in the film by previously adding it to the polyester resin.

The amount of the inorganic particles contained in the layer B is not particularly limited, and is preferably 1 to 35% by mass, and more preferably 2 to 30% by mass. When the content of the inorganic particles is less than 1% by mass, the effect of improving concealing properties and whiteness tends to be not exhibited. On the other hand, when the content of the inorganic particles is more than 35% by mass, deterioration in film-forming properties and marked reduction in the mechanical strength of the film are caused.

(Regarding Other Layers)

In the void-containing polyester film of the present invention, a coating layer can be provided on at least one side of the layer B, in order to improve wettability and adhesiveness of a printing ink, a coating agent, or the like. As the compound constituting the coating layer, a polyester resin is preferable. However, the present invention is not limited thereto, and a compound useful for improving adhesiveness of a polyester film such as a polyurethane resin, a polyester urethane resin or an acrylic resin can also be used.

The method for providing the coating layer is not particularly limited, and a commonly used method such as a gravure coating method, a kiss coating method, a dipping method, a spray coating method, a curtain coating method, an air knife coating method, a blade coating method or a reverse roll coating method can be applied. The coating step is also not particularly limited, and any method such as a method for coating before stretching of the film, a method for coating after longitudinal stretching or a method for coating on the surface of the film subjected to stretching treatment can be applied.

Next, a method for producing a void-containing polyester film according to the present invention will be described.

The method for producing a film of the present invention containing the internal void-containing layer (layer A) includes an extrusion step for forming a sheet having a layer (layer A) containing a polyester resin and a polypropylene resin satisfying the requirements (1) to (3), in which the polypropylene dispersed resin has a dispersed particle diameter of 7 to 13 μm in average circle equivalent diameter, by melt extrusion, and a stretching step for stretching the sheet at least in a uniaxial direction. Preferably, after the stretching step, a heat setting step for thermally setting at a temperature of (Tm−60° C.) to Tm, when the melting point of the polyester resin is Tm (° C.).

A method for producing a film (laminate) of the present invention having a layer B on at least one side of the layer A is the same as the method for producing a film containing the layer A, except for melt-extruding a laminate in which the layer B is laminated on the layer A into a sheet form in the extrusion step of the production method. Therefore, these will be described collectively below.

Each step will be described below.
(Extrusion Step)

In the extrusion step, it is important to use a polyester resin and a polypropylene resin satisfying the above-mentioned requirements (1) to (3). As a result, the dispersed particle diameter of the polypropylene dispersed resin in the layer A becomes 7 to 13 μm in average circle equivalent diameter. The dispersed particle diameter is preferably 8 to 12 μm. When the dispersed particle diameter is less than 7 μm, the void is liable to be crushed, thus it is difficult to obtain a predetermined void, and sufficient lightweight properties and concealing properties cannot be obtained. On the other hand, when the dispersed particle diameter is larger than 13 μm, a large void having an area of 10 to 50 μm$^2$ is formed, but since the number of the voids decreases, concealing properties deteriorate.

Other than the above, there is no particular limitation, and a general method for a polyester film can be applied. For example, the mixture of the raw material resins is dried by a usual method, then melt-extruded into a sheet form from a T-shaped nozzle, closely attached to a casting drum by an electrostatic application method or the like, and cooled and solidified to obtain an unstretched film. The dispersed particle diameter can be obtained by observing a cross section of the unstretched film obtained by cooling and solidifying a melt-extruded sheet in the casting drum. A detailed method for measuring the dispersed particle diameter will be described later.
(Stretching Step)

Next, the unstretched film is stretched, but the stretching step is not particularly limited. Hereinafter, a sequential biaxial stretching method most commonly used, particularly a method for longitudinally stretching an unstretched film in the longitudinal direction and then transversely stretching in the width direction will be described as an example, but the method is not limited thereto.

First, in the longitudinal stretching step in the longitudinal direction, the film is heated and stretched by 2.5 to 5.0 times between two or multiple rolls having different peripheral speeds. The heating means at this time may be either a method using a heating roll or a method using a non-contact heating medium, and they may be used in combination. From the viewpoint of film-forming properties, it is preferable that the temperature of the film is in the range of (Tg−10° C.) to (Tg+50° C.). Tg is the glass transition temperature of the polyester resin.

Subsequently, the uniaxially stretched film is introduced into a tenter and stretched by 2.5 to 5 times at a temperature of (Tg−10° C.) to (Tm−10° C.) in the width direction, whereby a biaxially stretched film is obtained. Tm is the melting point of the polyester resin.
(Heat Setting Step)

The film obtained as described above is subjected to a heat setting treatment. The heat setting temperature is preferably in the range of (Tm−60° C.) to Tm from the viewpoint of thermal dimensional stability. More preferably, the heat setting temperature is (Tm−50° C.) to (Tm−15° C.). At a temperature below the above temperature, thermal dimensional stability deteriorates. At a temperature exceeding the above temperature, the matrix polyester resin also softens.

In the present invention, the reclaimed raw material obtained from the void-containing polyester film can be returned to the extrusion step for reuse. Specifically, it is preferable that the content of the reclaimed raw material is set to 5 to 60% by mass in 100% by mass of the resin raw materials of the layer A.
(Regarding Void-Containing Polyester Film of Present Invention)

In the void-containing polyester film according to the present invention thus obtained, there are a large number of voids of optimum size to an extent that the void is not crushed (specifically, in the vertical cross section of the film surface, 10 or more voids having an area of 10 to 50 μm$^2$ are present per 10000 μm$^2$), so that it is possible to achieve both low specific gravity and high concealing properties. Preferably, the number of the voids is 20 or more per 10000 μm$^2$. When the number of the voids is less than 10 per 10000 μm$^2$, sufficient lightweight properties and concealing properties cannot be obtained. On the other hand, the upper limit thereof is not particularly limited, but in consideration of film-forming properties and the like, the upper limit is about 100 or less per 10000 μm$^2$ in general. Measurement methods of the area and number of voids will be described later.

The apparent density of the void-containing polyester film according to the present invention is 0.8 to 1.2 g/cm$^3$, and preferably, 0.9 to 1.15 g/cm$^3$. When the apparent density is less than 0.8 g/cm$^3$, the voids are too many, so that handling properties deteriorate during post processing such as printing processing or during use. On the other hand, when the apparent density exceeds 1.2 g/cm$^3$, sufficient lightweight properties and cushioning properties cannot be obtained. The method for measuring the apparent density will be described later.

The optical density (OD value) of the void-containing polyester film according to the present invention is preferably 0.55 or more (in terms of thickness 50 μm), and more preferably 0.6 or more. When the OD value is less than 0.55, sufficient concealing properties tend to be not obtained, and when used as a label or the like, image clarity in printing is inferior, and there is a possibility that the commercial value is impaired. The method for measuring the OD value will be described later.

The color tone b value of the void-containing polyester film according to the present invention is preferably 4.0 or less, and more preferably 3.0 or less. When the b value is larger than 4.0, the void-containing polyester film is inferior in whiteness, and when it is made into a label or the like, clarity in printing deteriorates, and there is a possibility that the commercial value is impaired.

In the void-containing polyester film according to the present invention, the heat shrinkage in the longitudinal direction and the width direction when heat-treated at 150° C. for 30 minutes are both preferably 2.0% or less, and more preferably 1.8% or less, from the viewpoint of post-processability and the like.

The thickness of the void-containing polyester film according to the present invention is not particularly limited, but it is preferably about 20 to 300 μm in general.

The void-containing polyester film of the present invention is low in cost, excellent in lightweight properties, cushioning properties and the like, and also has good concealing properties and whiteness. Therefore, the film is suitably used as a base material for labels, cards, packaging materials, and the like.

This application claims the benefit of priority to Japanese Patent Application No. 2016-064792, filed on Mar. 29, 2016 and Japanese Patent Application No. 2016-223529, filed on Nov. 16, 2016. The entire contents of the specifications of Japanese Patent Application No. 2016-064792, filed on Mar. 29, 2016 and Japanese Patent Application No. 2016-223529, filed on Nov. 16, 2016 are incorporated herein by reference.

EXAMPLES

Hereinafter, the present invention will be described in detail with reference to Examples, but the present invention should not be limited to such Examples.

Evaluation items in the following examples and comparative examples were measured by the following methods.

(1) Melt Viscosity ($\eta 1, \eta 2$)

The melt viscosities of the polyester resin and the polypropylene resin were measured under the conditions of a melting temperature of 280° C. and a shear rate of 121.6 $\sec^{-1}$, using Capilograph 1D (capillary length: 10 mm, capillary diameter: 1 mm) manufactured by Toyo Seiki Seisaku-sho, Ltd.

(2) Dispersed Particle Diameter of Polypropylene Resin

The dispersed particle diameter of the polypropylene resin in the layer A was measured by the following procedure. First, the raw material resins were melt-extruded into a sheet form from a T-shaped nozzle, closely attached to a casting drum by an electrostatic application method and cooled and solidified at 30° C. to obtain an unstretched film. A cross section of the obtained unstretched film was cut out with a microtome so as to be parallel to the longitudinal direction. Subsequently, the cross section was subjected to a platinum vapor deposition treatment at a discharge current of 40 mA and a treatment time of 30 sec using a magnetron sputtering apparatus "MSP-1S" manufactured by Vacuum Device Inc., and then observed using a scanning electron microscope "JSM-6510A" manufactured by JEOL Ltd. From the obtained image, dispersions of the polypropylene resin in the polyester resin were randomly selected at 300 points, the area of each dispersion was obtained, and the average value of diameters converted into a true circle was calculated to obtain a dispersed particle diameter.

(3) Film-Forming Properties

Evaluation was made as follows, based on the number of breaks when film formation was continued for 2 hours. In this example, good was evaluated as excellent in film-forming properties.

good: No break fair: 2 or 3 breaks poor: Film frequently broke, and film formation was impossible (4) Area and Number of Voids The area and number of voids in the layer A were measured by the following procedure. First, a cross section of the obtained film was cut out with a microtome so as to be perpendicular to the film surface. Subsequently, the cross section was subjected to a platinum vapor deposition treatment at a discharge current of 40 mA and a treatment time of 30 sec using a magnetron sputtering apparatus "MSP-1S" manufactured by Vacuum Device Inc., and then observed at a magnification of 500 times using a scanning electron microscope (SEM) "JSM-6510A" manufactured by JEOL Ltd. to obtain an SEM image. Next, using the image analysis software (WINROOF, manufactured by Mitani Corporation), the layer A portion in the SEM image was set within the analysis range, and all voids were extracted by automatic binarization process by discriminant analysis method. Then, the area of each void and the number of voids were calculated, and the number of voids having an area of 10 to 50 $\mu m^2$ per 10000 $\mu m^2$ was obtained from the following equation. For the measurement, the area of the layer A within the analysis range was set to at least 10000 $\mu m^2$. Therefore, for example, when the above minimum area was not exceeded in an SEM image, SEM images were taken until the area exceeds 10000 $\mu m^2$, and it was set as the analysis range.

Number of Voids of 10 to 50 $\mu m^2$ (pieces/10000 $\mu m^2$)=[Number of Voids of 10 to 50 $\mu m^2$ (pieces)/Area of Layer $A$ in Analysis Range ($\mu m^2$)]×$10^4$ (5) Apparent Density Four samples of films cut out into 5.0 cm square were superimposed, the thickness of the samples was measured at 10 points changing the position using a micrometer, and the average value of the total thickness of the four superimposed films was obtained to four significant figures. This average value was divided by 4 and rounded to three significant figures to obtain the average thickness per sheet (t: μm). The total weight (w: g) of the above four samples was measured to four significant figures using an automatic even balance, and the apparent density was obtained from the following equation. The apparent density was rounded to three significant figures.

Apparent Density (g/cm$^3$)=$w/(5.0 \times 5.0 \times t \times 10^{-4} \times 4)$ (6) Optical Density (OD value)

OD value was measured using a transmission densitometer "Ihac-T5" manufactured by Ihara Electronic Industries Co., Ltd. and converted into a value per 50 μm film thickness. The higher the OD value, the greater the concealing properties.

(7) Color Tone b Value

Color tone b value was measured according to JIS-Z8722 using a color difference meter "ZE6000" manufactured by Nippon Denshoku Industries Co., Ltd. and converted into a value per 50 μm film thickness. The smaller the color tone b value, the higher the whiteness is determined and the weaker the yellow taste is determined.

(8) Heat Shrinkage in Longitudinal Direction and Width Direction

Samples cut out into width 10 mm and length 250 mm with respect to the longitudinal direction and the width direction were prepared, and marked at 200 mm intervals, and interval (A) of the marks was measured under a constant tension of 5 gf. Next, after heat treatment of the film at 150° C. for 30 minutes under no load condition, interval (B) of the marks was measured under a constant tension of 5 gf, and the heat shrinkage was obtained from the following formula.

Heat Shrinkage (%)=(A−B)/A×100

Using the raw materials shown in Table 1, films of the following examples and comparative examples were prepared.

Example 1

[Production of Titanium Oxide Master Pellet (M1)]

A mixture of 50% by mass of anatase titanium dioxide having an average particle size of 0.3 μm (electron microscopy) to 50% by mass of a polyethylene terephthalate resin having a melt viscosity of 200 Pa·s was supplied to a vent type twin screw extruder, and kneaded to produce a titanium oxide-containing master pellet (M1).

[Production of Unstretched Film]

83% by mass of a polyethylene terephthalate resin having a melt viscosity of 200 Pa·s, 12% by mass of a polypropylene resin having a melt viscosity of 500 Pa·s, and 5% by mass of the titanium oxide-containing master pellet (M1) were mixed and subjected to vacuum drying to prepare raw materials for a void-containing polyester layer A. On the other hand, 30% by mass of the titanium oxide-containing master pellet (M1) and 70% by mass of a polyethylene terephthalate resin having a melt viscosity of 200 Pa·s were pellet-mixed and subjected to vacuum drying to prepare raw materials for an inorganic particle-containing polyester layer B. These raw materials were supplied to separate extruders and melted at 280° C. so that the void-containing polyester layer A and the inorganic particle-containing polyester layer B were laminated in the order of B/A/B, and joined by a feed block so that the thickness ratio thereof was 10/80/10, then extruded from a T-die onto a cooling drum adjusted to 30° C. to produce an unstretched film of two-kind three-layer constitution.

[Production of Void-Containing Polyester Film]

The unstretched film thus obtained was uniformly heated to 70° C. using a heating roll and longitudinally stretched by 3.4 times between two pairs of nip rolls having different peripheral speeds. At this time, as an auxiliary heating device of the film, an infrared heater (rated 20 W/cm) equipped with a gold reflecting film at the middle part of the nip rolls was placed so as to face the both surfaces of the film at a distance of 1 cm from the film surface, and the film was heated. The uniaxially stretched film thus obtained was introduced into a tenter, heated to 140° C., transversely stretched by 4.0 times, fixed in width, heat set at 240° C., and further relaxed 3% at 210° C. in the width direction to obtain a void-containing polyester film with a thickness of 50 μm (B/AB). The evaluation results of Example 1 are also shown in Table 1. As shown in Table 1, since the film of Example 1 used the raw material resins satisfying the requirements (1) to (3), the dispersed particle diameter of the polypropylene resin was controlled to an appropriate size, the number of large voids of 10 to 50 μm² was also large, and the apparent density, the OD value (concealing properties), the color tone b value, the heat shrinkage [MD direction (Machine direction) and TD direction (Transverse direction)], and film-forming properties were all good.

Example 2

In this example, a void-containing polyester film containing a reclaimed raw material was prepared. In detail, a reclaimed raw material was prepared by crushing and melt-extruding the ear portions obtained in the transverse stretching step in the tenter of Example 1. The addition amounts of the polyethylene terephthalate resin, the polypropylene resin, and the titanium oxide master pellet (M1) were adjusted so as to have the same composition of the layer A of the Example 1, except that the reclaimed raw material thus obtained was added to the layer A so that 25% by mass of the layer A was the reclaimed raw material, and this was used as raw materials for the layer A. A void-containing polyester film (B/A/B) with a thickness of 50 μm was obtained, in the same manner as in Example 1 except for that. The evaluation results of Example 2 are also shown in Table 1. As in Example 1, all characteristics of the film of Example 2 were also good.

Example 3

A void-containing polyester film (B/A/B) with a thickness of 50 μm containing a reclaimed raw material was obtained, in the same manner as in Example 2 except that the polyethylene terephthalate resin in the layer A was changed to the one having a melt viscosity of 132 Pa·s in Example 2. The evaluation results of Example 3 are also shown in Table 1. As in Examples 1 and 2, all characteristics of the film of Example 3 were also good.

Example 4

A void-containing polyester film (B/A/B) with a thickness of 50 μm using the reclaimed raw material was obtained, in the same manner as in Example 2 except that the polypropylene resin in the layer A was changed to one having a melt viscosity of 610 Pa·s and the addition amount of the reclaimed raw material was 45% by mass, in Example 2. The evaluation results of Example 4 are also shown in Table 1. As in Examples 1 to 3, all characteristics of the film of Example 4 were also good.

Example 5

A void-containing polyester film (B/AB) with a thickness of 50 μm containing the reclaimed raw material was obtained, in the same manner as in Example 2 except that the polyethylene terephthalate resin in the layer A was changed to one having a melt viscosity of 185 Pa·s and the polypropylene resin was changed to one having a melt viscosity of 372 Pa·s, in Example 2. The evaluation results of Example 5 are also shown in Table 1. As in Examples 1 to 4, all characteristics of the film of Example 5 were also good.

Example 6

A void-containing polyester film (B/AB) with a thickness of 50 μm containing the reclaimed raw material was obtained, in the same manner as in Example 2 except that the polyethylene terephthalate resin in the layer A was changed to one having a melt viscosity of 310 Pa·s in Example 2. The evaluation results of Example 6 are also shown in Table 1. As in Examples 1 to 5, all characteristics of the film of Example 6 were also good.

Example 7

A void-containing polyester film (B/AB) with a thickness of 50 μm containing the reclaimed raw material was obtained, in the same manner as in Example 2 except that the polyethylene terephthalate resin in the layer A was changed to one having a melt viscosity of 132 Pa·s and the polypropylene resin was changed to one having a melt viscosity of 553 Pa·s, in Example 2. The evaluation results of Example 7 are also shown in Table 1. As in Examples 1 to 6, all characteristics of the film of Example 7 were also good.

Example 8

In Example 8, a film consisting only of the layer A was prepared. In detail, a void-containing polyester film (the layer A only) with a thickness of 50 μm containing the reclaimed raw material was obtained, in the same manner as in Example 2 except that the layer B was not used, the polypropylene resin in the layer A was changed to one having a melt viscosity of 759 Pa·s, and the composition ratio was changed so as to be the same as in Example 1, in Example 2. At this time, the addition amounts of the polyethylene terephthalate resin, the polypropylene resin, and the titanium oxide master pellet (M1) were adjusted so that the composition ratio was the same as the composition ratio in all layers of Example 1. The evaluation results of Example 8 are also shown in Table 1. Break sporadically occurred during TD stretching (evaluation of film-forming properties in Table 1 was fair), but when a small amount of the sample before breaking was taken and each characteristic was measured, characteristics other than film-forming properties were all good.

Comparative Example 1

A void-containing polyester film (B/A/B) with a thickness of 50 μm containing the reclaimed raw material was obtained, in the same manner as in Example 2 except that the polypropylene resin in the layer A was changed to one having a melt viscosity of 200 Pa·s in Example 2. The evaluation results of Comparative Example 1 are also shown in Table 1. In Comparative Example 1, since the polypropylene resin has a low melt viscosity and the raw material resins of a low melt viscosity ratio were used, the dispersed particle diameter became small, the number of voids of 10 to 50 μm² was small, the apparent density was large, and concealing properties deteriorated.

Comparative Example 2

A void-containing polyester film (B/A/B) with a thickness of 50 μm containing the reclaimed raw material was formed, in the same manner as in Example 2 except that the polyethylene terephthalate resin in the layer A was changed to one having a melt viscosity of 78 Pa·s in Example 2. Break frequently occurred during TD stretching, but a small amount of the sample before breaking was taken and each physical property was measured. The evaluation results of Comparative Example 2 are also shown in Table 1. In Comparative Example 2, since the polyethylene terephthalate resin has a low melt viscosity and the raw material resins of a high melt viscosity ratio were used, the dispersed particle diameter was large, the number of voids of 10 to 50 μm² was small, and concealing properties deteriorated.

Comparative Example 3

A void-containing polyester film (B/A/B) with a thickness of 50 μm containing the reclaimed raw material was obtained, in the same manner as in Example 2 except that the polyethylene terephthalate resin in the layer A was changed to one having a melt viscosity of 420 Pa·s and the polypropylene resin was changed to one having a melt viscosity of 402 Pa·s, in Example 2. The evaluation results of Comparative Example 3 are also shown in Table 1. In Comparative Example 3, since the polyethylene terephthalate resin has a high melt viscosity and the raw material resins of a low melt viscosity ratio were used, the dispersed particle diameter of the polypropylene resin became small, the number of voids of 10 to 50 μm² was small, the apparent density was large, and concealing properties deteriorated.

Comparative Example 4

Comparative Example 4 is an example in which a film consisting only of the layer A was prepared and a compatibilizer was added to the layer A, as in Example 8. In detail, a void-containing polyester film with a thickness of 50 μm containing the reclaimed raw material was obtained (the layer A only), in the same manner as in Example 8 except that 1% by mass of polyethylene glycol PEG (molecular weight 4000) as a dispersant was added to the layer A in Example 8. Since break sporadically occurred during TD stretching, a small amount of the sample before breaking was taken and each characteristic was evaluated. The evaluation results of Comparative Example 4 are also shown in Table 1. In Comparative Example 4, since the compatibilizer was added, the dispersed particle diameter of the polypropylene resin became small, the apparent density was large, concealing properties deteriorated, and the color tone b value increased. In addition, since the compatibilizer was added and the melt viscosity of the polypropylene resin was high, film-forming properties decreased.

TABLE 1

| | | | Example 1 | Example 2 | Example 3 | Example 4 | Example 5 | Example 6 | Example 7 |
|---|---|---|---|---|---|---|---|---|---|
| Layer A | PET | η1 at 280° C. (Pa · s) | 200 | 200 | 132 | 200 | 185 | 310 | 132 |
| | PP | η1 at 280° C. (Pa · s) | 500 | 500 | 500 | 610 | 372 | 500 | 553 |
| | | Melt Viscosity Ratio (η2/η1) | 2.5 | 2.5 | 3.8 | 3.1 | 2.0 | 1.6 | 4.2 |
| | | Compatibilizer (PEG) | — | — | — | — | — | — | — |
| Layer B | PET | η1 at 280° C. (Pa · s) | 200 | 200 | 200 | 200 | 200 | 200 | 200 |
| Dispersed Particle Diameter | μm | | 8.7 | 8.8 | 11.3 | 10.5 | 8.4 | 7.5 | 12.2 |
| Apparent Density | g/cm³ | | 1.06 | 1.06 | 1.00 | 1.02 | 1.11 | 1.17 | 0.97 |
| OD Value (Optical Density: Concealing Properties) | | | 0.65 | 0.65 | 0.61 | 0.62 | 0.63 | 0.58 | 0.59 |
| Color Tone b Value | | | 1.3 | 1.6 | 1.8 | 1.8 | 1.6 | 1.6 | 1.8 |

TABLE 1-continued

| | | | | | | | | |
|---|---|---|---|---|---|---|---|---|
| Number of Voids of numbers/10000 μm² 10 to 50 μm² | | | 50 | 48 | 40 | 43 | 32 | 26 | 30 |
| Heat Shrinkage % (MD Direction) | | | 1.5 | 1.5 | 1.4 | 1.5 | 1.5 | 1.5 | 1.5 |
| Heat Shrinkage % (TD Direction) | | | 0.3 | 0.3 | 0.3 | 0.3 | 0.3 | 0.3 | 0.3 |
| Film-Forming Properties | | | good | good | good | good | good | good | good |

| | | | Example 8 | Comparative Example 1 | Comparative Example 2 | Comparative Example 3 | Comparative Example 4 |
|---|---|---|---|---|---|---|---|
| Layer A | PET | η1 at 280° C. (Pa · s) | 200 | 200 | 78 | 420 | 200 |
| | PP | η1 at 280° C. (Pa · s) | 759 | 200 | 500 | 402 | 759 |
| | | Melt Viscosity Ratio (η2/η1) | 3.8 | 1.0 | 6.4 | 1.0 | 3.8 |
| | | Compatibilizer (PEG) | — | — | — | — | 1 |
| Layer B | PET | η1 at 280° C. (Pa · s) | — | 200 | 200 | 200 | — |
| Dispersed Particle Diameter | | μm | 11.5 | 6.0 | 15.0 | 6.2 | 3.3 |
| Apparent Density | | g/cm³ | 0.99 | 1.28 | 0.92 | 1.26 | 1.31 |
| OD Value (Optical Density: Concealing Properties) | | | 0.60 | 0.51 | 0.53 | 0.51 | 0.49 |
| Color Tone b Value | | | 2.6 | 2.2 | 2.3 | 1.8 | 4.5 |
| Number of Voids of numbers/10000 μm² 10 to 50 μm² | | | 42 | 5 | 5 | 3 | 0 |
| Heat Shrinkage % (MD Direction) | | | 1.5 | 1.4 | 1.3 | 1.4 | 1.5 |
| Heat Shrinkage % (TD Direction) | | | 0.3 | 0.2 | 0.3 | 0.2 | 0.3 |
| Film-Forming Properties | | | fair | good | poor | good | fair |

INDUSTRIAL APPLICABILITY

According to the present invention, it is possible to provide a void-containing polyester film excellent in lightweight properties and cushioning properties, also having good concealing properties, whiteness, and thermal dimensional stability even when an inexpensive polypropylene resin is used as a void-generating agent.

The invention claimed is:

1. A void-containing polyester film comprising:
an internal void-containing layer (layer A),
wherein the layer A contains a polyester matrix resin and a polypropylene dispersed resin,
wherein the layer A comprises 3 to 25% by mass of the polypropylene dispersed resin, based on a total amount of resin in the layer A, the polypropylene dispersed resin having a dispersed particle diameter of from 7.5 to 12.2 μm,
wherein 26 to 50 voids having an area of 10 to 50 μm² are present per 10000 μm² when observing a vertical cross section of the film,
wherein the layer A does not contain a compatibilizer,
wherein the layer A satisfies the following requirements (1) to (3), and
an apparent density of the film is in a range of 0.8 to 1.2 g/cm³,
(1) a melt viscosity (η1) of the polyester resin at a melting temperature of 280° C. and a shear rate of 121.6 sec⁻¹ is 90 to 400 Pa·s,
(2) a melt viscosity (η2) of the polypropylene resin at a melting temperature of 280° C. and a shear rate of 121.6 sec⁻¹ is 300 to 850 Pa·s, and
(3) a ratio η2/η1 of the melt viscosity (η2) of the polypropylene resin to the melt viscosity (η1) of the polyester resin at a melting temperature of 280° C. and a shear rate of 121.6 sec⁻¹ is 1.6 to 4.2.

2. The void-containing polyester film according to claim 1, wherein the melt viscosity (η2) of the polypropylene resin is 700 Pa·s or less.

3. The void-containing polyester film according to claim 1, wherein the layer A further contains 5 to 60% by mass of a reclaimed raw material of the void-containing polyester film.

4. The void-containing polyester film according to claim 1, wherein a layer (layer B) made of a polyester resin is laminated on at least one side of the layer A.

5. The void-containing polyester film according to claim 4, wherein the layer B contains inorganic particles, the content of the inorganic particles being from 1 to 35% by mass.

6. The void-containing polyester film according to claim 5, wherein the inorganic particles are titanium oxide.

7. The void-containing polyester film according to claim 1, wherein an optical density is 0.55 or more (in terms of thickness 50 μm), and a color tone b value is 4 or less.

8. The void-containing polyester film according to claim 1, wherein heat shrinkage in a longitudinal direction and a width direction when heat-treated at 150° C. for 30 minutes are both 2.0% or less.

9. The void-containing polyester film according to claim 1, wherein the polypropylene dispersed resin corresponds to 90% by mass or more of a total amount of non-polyester resin in the layer A.

10. A void-containing polyester film comprising:
an internal void-containing layer (layer A),
wherein the layer A contains a polyester matrix resin and a polypropylene dispersed resin which satisfies the following requirements (1) to (3),
wherein the polypropylene dispersed resin corresponds to 100% by mass of a total amount of non-polyester resin in the layer A, wherein the layer A comprises 3 to 25% by mass of the polypropylene dispersed resin, based on a total amount of resin in the layer A, the polypropylene dispersed resin having a dispersed particle diameter of from 7.5 to 12.2 μm, wherein 26 to 50 voids having an area of 10 to 50 μm² are present per 10000 μm² when observing a vertical cross section of the film, wherein the layer A does not contain a compatibilizer, and wherein an apparent density of the film is in a range of 0.8 to 1.2 g/cm³, (1) a melt viscosity ($\eta 1$) of the polyester resin at a melting temperature of 280° C. and a shear rate of 121.6 sec$^{-1}$ is 90 to 400 Pa·s, (2) a melt viscosity ($\eta 2$) of the polypropylene resin at a melting temperature of 280° C. and a shear rate of 121.6 sec$^{-1}$ is 300 to 850 Pa·s, and (3) a ratio ($\eta 2/\eta 1$) of the melt viscosity ($\eta 2$) of the polypropylene resin to the melt viscosity ($\eta 1$) of the polyester resin at a melting temperature of 280° C. and a shear rate of 121.6 sec$^{-1}$ is 1.6 to 4.2.

11. A method for producing a void-containing polyester film comprising an internal void-containing layer (layer A), and having an apparent density in a range of 0.8 to 1.2 g/cm³, comprising:

an extrusion step for forming a sheet having the layer A containing a polyester matrix resin and a polypropylene dispersed resin satisfying the following requirements (1) to (3), wherein the polypropylene dispersed resin has a dispersed particle diameter of 7.5 to 12.2 μm in average circle equivalent diameter, by melt extrusion, and a stretching step for stretching the sheet at least in a uniaxial direction, wherein the layer A comprises 3 to 25% by mass of the polypropylene, based on a total amount of resin in the layer A, wherein 26 to 50 voids having an area of 10 to 50 μm² are present per 10000 μm² when observing a vertical cross section of the film, wherein the layer A does not contain a compatibilizer:

(1) a melt viscosity ($\eta 1$) of the polyester resin at a melting temperature of 280° C. and a shear rate of 121.6 sec$^{-1}$ is 90 to 400 Pa·s, (2) a melt viscosity ($\eta 2$) of the polypropylene resin at a melting temperature of 280° C. and a shear rate of 121.6 sec$^{-1}$ is 300 to 850 Pa·s, and (3) a ratio ($\eta 2/\eta 1$) of the melt viscosity ($\eta 2$) of the polypropylene resin to the melt viscosity ($\eta 1$) of the polyester resin at a melting temperature of 280° C. and a shear rate of 121.6 sec$^{-1}$ is 1.6 to 4.2.

12. The method for producing a void-containing polyester film according to claim 11, comprising, after the stretching step, a heat setting step for thermally setting at a temperature of (Tm−60° C.) to Tm, when the melting point of the polyester resin is Tm (° C.).

13. The method for producing a void-containing polyester film according to claim 11, wherein the reclaimed raw material obtained from the void-containing polyester film is returned to the extrusion step, and a proportion of the reclaimed raw material is set to 5 to 60% by mass in 100% by mass of resin raw materials of the layer A.

14. A method for producing a void-containing polyester film in which a layer (layer B) made of a polyester resin is laminated on at least one side of an internal void-containing layer (layer A), and having an apparent density in a range of 0.8 to 1.2 g/cm³, comprising:

an extrusion step for forming a sheet having the layer A containing a polyester matrix resin and a polypropylene dispersed resin satisfying the following requirements (1) to (3), wherein the polypropylene dispersed resin has a dispersed particle diameter of 7.5 to 12.2 μm in average circle equivalent diameter; and the layer B, by melt extrusion, and a stretching step for stretching the sheet at least in a uniaxial direction, wherein the layer A comprises 3 to 25% by mass of the polypropylene, based on a total amount of resin in the layer A, wherein 26 to 50 voids having an area of 10 to 50 μm² are present per 10000 μm² when observing a vertical cross section of the film, wherein the layer A does not contain a compatibilizer:

(1) a melt viscosity ($\eta 1$) of the polyester resin at a melting temperature of 280° C. and a shear rate of 121.6 sec$^{-1}$ is 90 to 400 Pa·s, (2) a melt viscosity ($\eta 2$) of the polypropylene resin at a melting temperature of 280° C. and a shear rate of 121.6 sec$^{-1}$ is 300 to 850 Pa·s, and (3) a ratio ($\eta 2/\eta 1$) of the melt viscosity ($\eta 2$) of the polypropylene resin to the melt viscosity ($\eta 1$) of the polyester resin at a melting temperature of 280° C. and a shear rate of 121.6 sec$^{-1}$ is 1.6 to 4.2.

\* \* \* \* \*